(12) United States Patent
Knowles (10) Patent No.: US 7,679,029 B2
(45) Date of Patent: Mar. 16, 2010

(54) SYSTEMS AND METHODS TO SHAPE LASER LIGHT AS A LINE BEAM FOR INTERACTION WITH A SUBSTRATE HAVING SURFACE VARIATIONS

(75) Inventor: David S. Knowles, San Diego, CA (US)

(73) Assignee: Cymer, Inc., San Diego, CA (US)

(*) Notice: Subject to any disclaimer, the term of this patent is extended or adjusted under 35 U.S.C. 154(b) by 1143 days.

(21) Appl. No.: 11/261,846

(22) Filed: Oct. 28, 2005

(65) Prior Publication Data

US 2007/0095805 A1    May 3, 2007

(51) Int. Cl.
*B23K 26/04* (2006.01)
*B23K 26/06* (2006.01)
*B23K 26/073* (2006.01)

(52) U.S. Cl. .................. 219/121.65; 219/121.66; 219/121.73; 219/121.83

(58) Field of Classification Search ............ 219/121.61, 219/121.62, 121.65, 121.66, 121.73, 121.78–121.83, 219/121.85; 356/445
See application file for complete search history.

(56) References Cited

U.S. PATENT DOCUMENTS

| | | | | |
|---|---|---|---|---|
| 2,740,963 A | | 4/1956 | Donovan ............. 342/34 |
| 3,813,160 A | * | 5/1974 | Nowak .............. 355/71 |
| 4,009,391 A | | 2/1977 | Janes et al. ........... 250/281 |
| 4,127,777 A | * | 11/1978 | Binder ............... 250/548 |
| 4,157,568 A | * | 6/1979 | Ohki et al. ........... 369/44.24 |
| 4,168,894 A | * | 9/1979 | Adolph .............. 396/318 |
| 4,223,279 A | | 9/1980 | Bradford, Jr. et al. ... 331/94.5 |
| 4,329,664 A | | 5/1982 | Javan ............... 359/276 |
| 4,398,806 A | | 8/1983 | Bennett et al. ........ 359/487 |
| 4,410,992 A | | 10/1983 | Javan ............... 372/32 |
| 4,455,658 A | | 6/1984 | Sutter, Jr. ............ 372/38 |
| 4,494,167 A | | 1/1985 | Molyneux-Berry ...... 361/270 |
| 4,500,996 A | | 2/1985 | Sasnett et al. ......... 372/19 |
| 4,550,408 A | | 10/1985 | Karning et al. ........ 372/58 |

(Continued)

FOREIGN PATENT DOCUMENTS

JP    2601410    1/1997

(Continued)

OTHER PUBLICATIONS

U.S. Appl. No. 10/606,412, filed Jun. 2003, Saethre et al.

(Continued)

*Primary Examiner*—Samuel M Heinrich
(74) *Attorney, Agent, or Firm*—Matthew K. Hillman (57) ABSTRACT

Systems and methods are disclosed for shaping laser light as a line beam for interaction with a film that may have an imperfect, non-planar surface. The system may include a beam stop that defines an edge; a sensor that measures a distance between a selected point on a surface of the film and a reference plane and generates a signal representative of the measured distance; and an actuator coupled to the beam stop and responsive to the signal to move a portion of beam stop edge. Movement of the beam stop edge portion shifts a corresponding portion of the focused line beam in a direction normal to the reference plane to produce a line beam that more closely conforms to the surface profile of the film.

20 Claims, 3 Drawing Sheets

U.S. PATENT DOCUMENTS

| | | | |
|---|---|---|---|
| 4,606,034 A | 8/1986 | Eden et al. ..................... 372/57 |
| 4,618,759 A | 10/1986 | Muller et al. ................. 219/121 |
| 4,632,561 A * | 12/1986 | Rosencwaig et al. ......... 356/432 |
| 4,696,792 A | 9/1987 | Hobson ........................ 376/377 |
| 4,716,013 A | 12/1987 | Veronesi et al. .............. 376/353 |
| 4,723,256 A | 2/1988 | Hoag ............................. 372/93 |
| 4,757,511 A | 7/1988 | Klingel et al. .................. 372/58 |
| 4,764,339 A | 8/1988 | Lake et al. .................... 376/353 |
| 4,770,846 A | 9/1988 | Land et al. .................... 376/353 |
| 4,887,019 A * | 12/1989 | Reis et al. ................. 359/202.1 |
| 4,891,820 A | 1/1990 | Rando et al. ................... 372/93 |
| 4,902,998 A | 2/1990 | Pollard .......................... 336/60 |
| 4,948,983 A * | 8/1990 | Maruyama et al. ........... 250/548 |
| 4,959,840 A | 9/1990 | Akins et al. ................... 372/57 |
| 4,983,859 A | 1/1991 | Nakajima et al. ............ 307/419 |
| 5,005,180 A | 4/1991 | Edelman et al. ................ 372/57 |
| 5,017,499 A | 5/1991 | Hakuta et al. ................ 436/124 |
| 5,022,033 A | 6/1991 | Hackell ......................... 372/25 |
| 5,023,884 A | 6/1991 | Akins et al. ................... 372/57 |
| 5,025,445 A | 6/1991 | Anderson et al. .............. 372/20 |
| 5,025,446 A | 6/1991 | Kuizenga ...................... 372/21 |
| 5,090,020 A | 2/1992 | Bedwell ........................ 372/59 |
| 5,091,778 A | 2/1992 | Keeler .......................... 348/31 |
| 5,100,609 A | 3/1992 | Oosterkamp ................ 376/210 |
| 5,113,408 A | 5/1992 | Bihler ........................... 372/93 |
| 5,142,543 A | 8/1992 | Wakabayashi et al. ......... 372/32 |
| 5,149,659 A | 9/1992 | Hakuta et al. .................. 436/55 |
| 5,151,754 A * | 9/1992 | Ishibashi et al. ............. 356/490 |
| 5,157,684 A | 10/1992 | Benda et al. .................. 372/95 |
| 5,181,135 A | 1/1993 | Keeler ......................... 398/104 |
| 5,189,678 A | 2/1993 | Ball et al. ...................... 372/28 |
| 5,313,481 A | 5/1994 | Cook et al. .................... 372/37 |
| 5,315,611 A | 5/1994 | Ball et al. ...................... 372/56 |
| 5,325,407 A | 6/1994 | Forsyth et al. ............... 376/205 |
| 5,329,350 A | 7/1994 | Wright et al. ................ 356/218 |
| 5,329,398 A | 7/1994 | Lai et al. ..................... 359/566 |
| 5,359,620 A | 10/1994 | Akins ........................... 372/58 |
| 5,416,391 A | 5/1995 | Correa et al. ................. 318/558 |
| 5,425,922 A | 6/1995 | Kawaguchi .................. 422/186 |
| 5,432,122 A | 7/1995 | Chae ........................... 437/101 |
| 5,440,578 A | 8/1995 | Sandstrom ..................... 372/59 |
| 5,448,580 A | 9/1995 | Birx et al. ...................... 372/38 |
| 5,450,436 A | 9/1995 | Mizoguchi et al. ............. 372/59 |
| 5,463,650 A | 10/1995 | Ito et al. ........................ 372/57 |
| 5,471,965 A | 12/1995 | Kapich ........................ 123/565 |
| 5,543,916 A | 8/1996 | Kachanov ................... 356/451 |
| 5,563,555 A | 10/1996 | Nalos et al. .................... 331/81 |
| 5,642,374 A | 6/1997 | Wakabayashi et al. ......... 372/57 |
| 5,683,547 A * | 11/1997 | Azuma et al. ................ 438/695 |
| 5,754,579 A | 5/1998 | Mizoguchi et al. ............. 372/58 |
| 5,771,258 A | 6/1998 | Morton et al. .................. 372/57 |
| 5,835,520 A | 11/1998 | Das et al. ....................... 372/57 |
| 5,852,621 A | 12/1998 | Sandstrom ..................... 372/25 |
| 5,854,487 A * | 12/1998 | Braunstein et al. .............. 850/9 |
| 5,856,991 A | 1/1999 | Ershov .......................... 372/57 |
| 5,863,017 A | 1/1999 | Larson et al. ............... 248/176.1 |
| 5,891,764 A | 4/1999 | Ishihara et al. ............... 438/151 |
| 5,933,271 A | 8/1999 | Waarts et al. ........... 359/341.31 |
| 5,936,988 A | 8/1999 | Partlo et al. .................... 372/38 |
| 5,940,421 A | 8/1999 | Partlo et al. .................... 372/38 |
| 5,946,330 A | 8/1999 | Ozygus et al. ................. 372/19 |
| 5,953,360 A | 9/1999 | Vitruk et al. ................... 372/87 |
| 5,978,394 A | 11/1999 | Newman et al. ............... 372/32 |
| 5,978,406 A | 11/1999 | Rokni et al. .................... 372/58 |
| 5,982,800 A | 11/1999 | Ishihara et al. ................. 372/57 |
| 5,991,324 A | 11/1999 | Knowles et al. ................ 372/57 |
| 5,999,555 A | 12/1999 | Connors et al. ................ 372/99 |
| 6,005,879 A | 12/1999 | Sandstrom et al. ............. 372/25 |
| 6,014,206 A | 1/2000 | Basting et al. ................ 356/138 |
| 6,014,398 A | 1/2000 | Hofmann et al. ............... 372/60 |
| 6,016,325 A | 1/2000 | Ness et al. ...................... 372/38 |
| 6,018,537 A | 1/2000 | Hofmann et al. ............... 372/25 |
| 6,028,880 A | 2/2000 | Carlesi et al. .................. 372/58 |
| 6,056,426 A * | 5/2000 | Jenkins ........................ 362/558 |
| 6,067,306 A | 5/2000 | Sandstrom et al. ............. 372/38 |
| 6,067,311 A | 5/2000 | Morton et al. .................. 372/57 |
| 6,094,448 A | 7/2000 | Fomenkov et al. ........... 372/102 |
| 6,104,735 A | 8/2000 | Webb ........................... 372/37 |
| 6,128,323 A | 10/2000 | Myers et al. ................... 372/38 |
| 6,130,904 A | 10/2000 | Ishihara et al. ................. 372/59 |
| 6,143,661 A | 11/2000 | Kousai et al. ................ 438/689 |
| 6,151,346 A | 11/2000 | Partlo et al. .................... 372/38 |
| 6,151,349 A | 11/2000 | Gong et al. .................... 372/58 |
| 6,151,350 A | 11/2000 | Komori et al. ................. 372/59 |
| 6,157,662 A | 12/2000 | Scaggs et al. .................. 372/60 |
| 6,160,831 A | 12/2000 | Kleinschmidt et al. ......... 372/57 |
| 6,163,010 A | 12/2000 | Kobsa ..................... 219/121.61 |
| 6,164,116 A | 12/2000 | Rice et al. ..................... 73/1.72 |
| 6,177,301 B1 | 1/2001 | Jung ............................ 438/150 |
| 6,181,719 B1 | 1/2001 | Sukhman et al. ........... 372/38.1 |
| 6,188,710 B1 | 2/2001 | Besaucele et al. .............. 372/60 |
| 6,192,064 B1 | 2/2001 | Algots et al. ................... 372/99 |
| 6,208,674 B1 | 3/2001 | Webb et al. .................... 372/57 |
| 6,208,675 B1 | 3/2001 | Webb ........................... 372/58 |
| 6,212,211 B1 | 4/2001 | Azzola et al. .................. 372/33 |
| 6,212,214 B1 | 4/2001 | Vogler et al. ................... 372/59 |
| 6,215,595 B1 | 4/2001 | Yamazaki et al. ............ 359/623 |
| 6,219,368 B1 | 4/2001 | Govorkov ...................... 372/59 |
| 6,235,438 B1 * | 5/2001 | Suzuki et al. .................. 430/30 |
| 6,240,117 B1 | 5/2001 | Gong et al. .................... 372/58 |
| 6,243,406 B1 | 6/2001 | Heist et al. ..................... 372/59 |
| 6,281,471 B1 | 8/2001 | Smart ...................... 219/121.62 |
| 6,291,796 B1 * | 9/2001 | Lu et al. .................. 219/121.68 |
| 6,300,176 B1 | 10/2001 | Zhang et al. ................. 438/166 |
| 6,310,342 B1 * | 10/2001 | Braunstein et al. ............. 850/2 |
| 6,314,119 B1 | 11/2001 | Morton .......................... 372/57 |
| 6,316,338 B1 | 11/2001 | Jung ............................ 438/487 |
| 6,317,447 B1 | 11/2001 | Partlo et al. .................... 372/57 |
| 6,317,448 B1 | 11/2001 | Das et al. ....................... 372/60 |
| 6,322,625 B2 | 11/2001 | Im ................................ 117/43 |
| 6,330,261 B1 | 12/2001 | Ishihara et al. ............. 372/38.1 |
| 6,330,267 B1 | 12/2001 | Vogler et al. ................... 372/59 |
| 6,359,922 B1 | 3/2002 | Partlo et al. .................... 372/58 |
| 6,368,945 B1 | 4/2002 | Im .............................. 438/487 |
| 6,370,174 B1 | 4/2002 | Onkel et al. ................ 372/38.04 |
| 6,373,623 B1 | 4/2002 | Ohshima et al. ........... 359/341.3 |
| 6,381,257 B1 | 4/2002 | Ershov et al. .................. 372/57 |
| 6,389,052 B2 | 5/2002 | Albrecht et al. ................ 372/58 |
| 6,393,042 B1 | 5/2002 | Tanaka ........................ 372/101 |
| 6,396,856 B1 | 5/2002 | Sucha et al. ................... 372/25 |
| 6,407,836 B1 | 6/2002 | Fukushima .................. 398/178 |
| 6,414,979 B2 | 7/2002 | Ujazdowski et al. ........... 372/87 |
| 6,440,785 B1 | 8/2002 | Yamazaki et al. ............ 438/164 |
| 6,442,181 B1 | 8/2002 | Oliver et al. ................... 372/25 |
| 6,448,534 B1 | 9/2002 | Kobsa ..................... 219/121.72 |
| 6,456,380 B1 | 9/2002 | Naganuma ................... 356/450 |
| 6,466,365 B1 | 10/2002 | Maier et al. .................. 359/355 |
| 6,466,602 B1 | 10/2002 | Fleurov et al. ................. 372/87 |
| 6,477,192 B2 | 11/2002 | Govorkov et al. .............. 372/57 |
| 6,477,193 B2 | 11/2002 | Oliver et al. ................... 372/58 |
| 6,490,307 B1 | 12/2002 | De Mos et al. ................. 372/59 |
| 6,490,308 B2 | 12/2002 | Albrecht et al. ................ 372/59 |
| 6,493,364 B1 | 12/2002 | Baumler et al. ................ 372/15 |
| 6,493,370 B2 | 12/2002 | Albrecht et al. ................ 372/58 |
| 6,493,374 B1 | 12/2002 | Fomenkov et al. ........... 372/102 |
| 6,501,061 B1 | 12/2002 | Kitai et al. ................... 250/205 |
| 6,504,861 B2 | 1/2003 | Albrecht et al. ................ 372/59 |
| 6,507,422 B1 | 1/2003 | Fukushima .................... 398/78 |
| 6,529,531 B1 | 3/2003 | Everage et al. ................. 372/20 |
| 6,529,533 B1 | 3/2003 | Voss ......................... 372/29.01 |
| 6,532,247 B2 | 3/2003 | Spangler et al. ................ 372/61 |
| 6,535,531 B1 | 3/2003 | Smith et al. .................... 372/25 |
| 6,538,737 B2 | 3/2003 | Sandstrom et al. ........... 356/333 |
| 6,539,046 B2 | 3/2003 | Newman et al. ............... 372/98 |

| | | | | |
|---|---|---|---|---|
| RE38,054 E | 4/2003 | Hofmann et al. ............... 372/25 | 2004/0022293 A1 | 2/2004 | Rule et al. .................... 372/58 |
| 6,549,551 B2 | 4/2003 | Partlo et al. .................. 372/98 | 2004/0047385 A1 | 3/2004 | Knowles et al. ............... 372/55 |
| 6,553,049 B1 | 4/2003 | Besaucele et al. ............. 372/57 | 2004/0060504 A1 | 4/2004 | Takeda et al. ................ 117/84 |
| 6,555,449 B1 | 4/2003 | Im et al. ..................... 438/487 | 2005/0109743 A1 | 5/2005 | Tanabe et al. ........... 219/121.73 |
| 6,556,600 B2 | 4/2003 | Sandstrom et al. ............ 372/25 | 2005/0174576 A1 | 8/2005 | Rao et al. .................... 356/454 |
| 6,560,254 B2 | 5/2003 | Stamm ........................ 372/32 | 2006/0227403 A1* | 10/2006 | Kim et al. .................... 359/288 |
| 6,563,077 B2 | 5/2003 | Im ........................ 219/121.65 | 2007/0001127 A1* | 1/2007 | Reiley et al. ............. 250/492.2 |
| 6,563,853 B2 | 5/2003 | Heist et al. .................... 372/57 | | | |
| 6,567,450 B2 | 5/2003 | Myers et al. .................. 372/57 | | | |

FOREIGN PATENT DOCUMENTS

| | | |
|---|---|---|
| JP | 09-097951 | 4/1997 |
| JP | 09090187 A * | 4/1997 |
| JP | 2701184 | 10/1997 |
| JP | 410003045 | 1/1998 |
| JP | 10-074993 | 3/1998 |
| JP | 410242040 A * | 9/1998 |
| JP | 2000-022255 | 1/2000 |
| JP | 2001-332793 | 11/2001 |
| JP | 2002-208746 | 7/2002 |
| JP | 3297108 | 7/2002 |
| JP | 2002-294856 | 10/2002 |

| | | |
|---|---|---|
| 6,573,531 B1 | 6/2003 | Im et al. ..................... 257/45 |
| 6,577,380 B1 | 6/2003 | Sposili et al. ................. 355/67 |
| 6,582,827 B1 | 6/2003 | Im ............................ 428/446 |
| 6,584,132 B2 | 6/2003 | Morton ........................ 372/57 |
| 6,611,336 B1 | 8/2003 | Walmsley et al. ........... 356/450 |
| 6,618,421 B2 | 9/2003 | Das et al. ...................... 372/55 |
| 6,621,846 B1 | 9/2003 | Sandstrom et al. ............ 372/57 |
| 6,624,424 B2 | 9/2003 | Eckert et al. ................ 250/372 |
| 6,625,191 B2 | 9/2003 | Knowles et al. ............... 372/55 |
| 6,638,800 B1 | 10/2003 | Ishihara et al. .............. 438/166 |
| 6,654,097 B1* | 11/2003 | Nishi .......................... 355/53 |
| 6,671,294 B2 | 12/2003 | Kroyan et al. ................. 372/20 |
| 6,687,562 B2 | 2/2004 | Patel et al. ................... 700/121 |
| 6,690,704 B2 | 2/2004 | Fallon et al. .................. 372/55 |
| 6,693,939 B2 | 2/2004 | Klene et al. ................... 372/58 |
| 6,704,340 B2 | 3/2004 | Ershov et al. ................. 372/58 |
| 6,721,340 B1 | 4/2004 | Fomenkov et al. ............ 372/25 |
| 6,750,109 B2* | 6/2004 | Culp et al. ................... 438/354 |
| 6,750,972 B2 | 6/2004 | Sandstrom et al. .......... 356/454 |
| 6,757,316 B2 | 6/2004 | Newman et al. ............... 372/57 |
| 6,765,945 B2 | 7/2004 | Sandstrom et al. ............ 372/55 |
| 6,782,031 B1 | 8/2004 | Hofmann et al. .............. 372/90 |
| 6,795,474 B2 | 9/2004 | Partlo et al. .................. 372/57 |
| 6,798,812 B2 | 9/2004 | Rylov et al. ................... 372/55 |
| 6,853,653 B2 | 2/2005 | Spangler et al. ............... 372/20 |
| 6,865,210 B2 | 3/2005 | Ershov et al. ................. 372/55 |
| 6,879,617 B2 | 4/2005 | Ariga et al. ................... 372/55 |
| 6,882,674 B2 | 4/2005 | Wittak et al. .................. 372/55 |
| 6,894,785 B2 | 5/2005 | Rao et al. .................... 356/450 |
| 6,906,782 B2* | 6/2005 | Nishi .......................... 355/53 |
| 6,912,052 B2 | 6/2005 | Rao et al. .................... 356/451 |
| 6,963,595 B2 | 11/2005 | Rule et al. ..................... 372/55 |
| 6,985,508 B2 | 1/2006 | Knowles et al. ............... 372/55 |
| 7,002,443 B2 | 2/2006 | Ness et al. .................... 336/57 |
| 7,123,997 B2* | 10/2006 | Li ............................. 700/121 |
| 7,157,703 B2* | 1/2007 | Nakasuji et al. ............. 250/311 |
| 7,317,179 B2* | 1/2008 | Akins et al. ............... 250/201.1 |
| 7,423,286 B2* | 9/2008 | Handy et al. ................... 257/48 |
| 7,495,191 B2* | 2/2009 | Chen ..................... 219/121.73 |
| 2001/0020195 A1 | 9/2001 | Patel et al. ................... 700/121 |
| 2001/0050931 A1 | 12/2001 | Iso ............................. 372/25 |
| 2002/0006149 A1 | 1/2002 | Spangler et al. ............... 372/61 |
| 2002/0012376 A1 | 1/2002 | Das et al. ...................... 372/58 |
| 2002/0021728 A1 | 2/2002 | Newman et al. ............... 372/55 |
| 2002/0048288 A1 | 4/2002 | Kroyan et al. ................. 372/20 |
| 2002/0101589 A1 | 8/2002 | Sandstrom et al. .......... 356/334 |
| 2002/0105994 A1 | 8/2002 | Partlo et al. .................. 372/22 |
| 2002/0114370 A1 | 8/2002 | Onkels et al. ................. 372/55 |
| 2002/0154668 A1 | 10/2002 | Knowles et al. ............... 372/55 |
| 2002/0154671 A1 | 10/2002 | Knowles et al. ............... 372/57 |
| 2002/0162973 A1 | 11/2002 | Cordingley et al. ...... 250/492.2 |
| 2002/0167975 A1 | 11/2002 | Spangler et al. ............... 372/20 |
| 2002/0167986 A1 | 11/2002 | Pan et al. ..................... 372/55 |
| 2003/0012234 A1 | 1/2003 | Watson et al. ................. 372/25 |
| 2003/0016363 A1 | 1/2003 | Sandstrom et al. .......... 356/452 |
| 2003/0031216 A1 | 2/2003 | Fallon et al. ............. 372/29.01 |
| 2003/0058429 A1 | 3/2003 | Schriever .................... 355/133 |
| 2003/0096489 A1 | 5/2003 | Im et al. ..................... 438/487 |
| 2003/0099269 A1 | 5/2003 | Ershov et al. ................. 372/55 |
| 2003/0118072 A1 | 6/2003 | Wittak et al. ................. 514/527 |
| 2003/0119286 A1 | 6/2003 | Im et al. ..................... 438/487 |
| 2003/0128348 A1* | 7/2003 | Nishi .......................... 355/53 |
| 2003/0138019 A1 | 7/2003 | Rylov et al. ................... 372/58 |
| 2003/0219094 A1 | 11/2003 | Basting et al. ................ 378/34 |

OTHER PUBLICATIONS

U.S. Appl. No. 10/607,407, filed Jun. 2003, Ness et al.
U.S. Appl. No. 10/712,545, filed Nov. 2003, Webb et al.
Burnett et al., "Symmetry of spatial-dispersion-induced birefringence and its implications of CaF2 ultraviolet optics," J. Microlith., Microsyst., vol. 1, No. 3, Oct. 2002.
Crowther et al., "A fly's eye condenser system for uniform illumination," Proc. of SPIE, International Optical Design Conference 2002, vol. 4832 (2002), pp. 4832-4835.
Dainesi et al., Optimization of a beam delivery system for a short-pulse KrF laser used for material ablation.
Dassow et al., "YVO4 laser crystallization for thin film transistors with a high mobility," Mat. Res. Soc. Sympo., Proc. vol. 621, pp. 9.3.1-9.3.6, (2000).
Ewing et al., Phys. Rev. A12, 129 (1975).
Furuta et al., "Bottom-gate poly-si thin film transistors using XeCl excimer laser annealing an dion doping techniques," IEEE Trans. Electron Devices, vol. 40, No. 14 (1993) pp. 1964-1969.
Gerlach et al., "Brewster window and windowless resonant spectrophones for intracavity operation", App. Phys. 23:319-326 (1980).
Hoffman et al., Appl. Phys. Lett. 9, 538 (1976).
Kahlert et al., "High-resolution optics for thin Si-film crystallization using excimer lasers: present status and future development," Proc. Or SPIE-IS&T, Electronic Imaging, SPIE vol. 5004 (2003), pp. 20-27.
Kim et al., "Excimer-laser crystallized poly-si TFT's with transparent gate, IEEE transactions on electron devices", vol. 43, No. 4 (Apr. 1996), pp. 576-579.
Kudo et al., "Advanced lateral crystal growth of a Si thin films by double-pulsed irradiation of all solid-state lasers", Mat. Res. Soc. Symp. Proc. vol. 792, pp. A16.5.1-6, (2003).
Lee, "A study on laser annealed polycrystalline silicon thin film transistors (TFTs) with SiNx gate insulator," Chapter 4, Expermiental Details, http://tftlcd.kyunghee.ac.kr/reseach/poly-Si/chapter4.html.
Lee, "A study on laser annealed polycrystalline silicon thin film transistors (TFTs) with SiNx gate insulator," Chapter 5, Electrical and Structural Properties of ELA Poly-Si Films, http://tftlcd.khu.ac.kr/research/poly-Si/chapter5.html.
Morita et al., "UV pulsed laser annealing of Si implanted silicon film and low-temperature super thin-film transistors," Jpn. J. Appl. Phys., vol 28, No. 2 (1989) pp. L309-L311.
Mstnews Feb. 2003, http://www.suss-microoptics.com/downloads/Publications/Miniaturization_of_Imaging_System.pdf.
Ozaki et al., Cylindrical fly's eye lens for intensity redistribution of an excimer laser beam, Applied Optics, vol. 28, Issue 1 (Jan. 1989) p. 106.
Rosengren, "Optimal Optoacoustic Detector Design", Applied Optics 14(8):1961-1976 (Aug. 1975).

Sera et al., "High-performance TFT's fabricated by XeCl excimer laser annealing of hydrogenated amorphous-silicon film," IEE Transactions on Electron Devices, vol. 36, Np. 12, (1989), pp. 2868-72.

Shimizu et al., "On-chip bottom gate polysilicon and amorphous silicon thin-film transistors using excimer laser annealed silicon nitride gate," Jpn. J. Appl. Phys., vol. 29, No. 10 (1990), pp. L1775-L1777.

Sun et al., "Excimer laser annealing process for polysilicon TFT AMLCD application," Record of 1994 Int. Disp. Res. Conf. (1994), pp. 134-147.

Voutsas, "A new era of crystallization: Advances in polysilicon crystallization and crystal engineering," applied Surface Science, 208-209, pp. 250-262, (2003).

Voutsas et al., "Effect of process parameters on the structural characteristics of laterally grown, laser-annealed polycrystalline silicon films," Jour. Of Appld. Phys., vol. 94, No. 12 (Dec. 15, 2003).

Wexler et al., "Use of XeCl amplifiers for degenerate four wave mixing", American Institute of-Physics, Excimer Lasers—1983, C. Rhodes, et al. Editors, pp. 164-171, (1983).

Yres et al., "Low temperature poly-Si for liquid crystal display addressing," Philips Research Laboratories Surrey, England, (May 11, 1993); http://www.atip.org/ATIP/public/atip.reports.93/mitalcd.93.html.

* cited by examiner

SYSTEMS AND METHODS TO SHAPE LASER LIGHT AS A LINE BEAM FOR INTERACTION WITH A SUBSTRATE HAVING SURFACE VARIATIONS

CROSS-REFERENCE TO RELATED APPLICATIONS

The present invention is related to U.S. application Ser. No. 10/781,251, titled "VERY HIGH ENERGY, HIGH STABILITY GAS DISCHARGE LASER SURFACE TREATMENT SYSTEM," filed on Feb. 18, 2004, to U.S. application Ser. No. 10/884,101, titled "LASER THIN FILM POLY-SILICON ANNEALING OPTICAL SYSTEM," filed on Jul. 1, 2004, and to U.S. application Ser. No. 11/138,001, titled "SYSTEMS AND METHODS FOR IMPLEMENTING AN INTERACTION BETWEEN A LASER SHAPED AS A LINE BEAM AND A FILM DEPOSITED ON A SUBSTRATE" filed on May 26, 2005, the disclosures of each of which are hereby incorporated by reference herein.

FIELD OF THE INVENTION

The present invention relates to systems and methods for shaping laser light as a line beam. Uses of laser light shaped as a line beam may include, but are not necessarily limited to, the melting of an amorphous silicon film to induce crystallization of the film upon resolidification of the melted segment, for the purpose of manufacturing thin film transistors (TFT's).

BACKGROUND OF THE INVENTION

Laser crystallization of an amorphous silicon film that has been deposited on a substrate, e.g., glass, represents a promising technology for the production of material films having relatively high electron mobilities. Once crystallized, this material can then be used to manufacture thin film transistors (TFT's) and in one particular application, TFT's suitable for use in relatively large liquid crystal displays (LCD's). Other applications for crystallized silicon films may include Organic LED (OLED), System on a Panel (SOP), flexible electronics and photovoltaics. In more quantitative terms, high volume production systems may be commercially available in the near future capable of quickly crystallizing a film having a thickness of about 90 nm and a width of about 700 mm or longer.

Laser crystallization may be performed using pulsed laser light that is optically shaped to a line beam, e.g., laser light that is focused in a first axis, e.g., the short-axis, and expanded in a second axis, e.g., the long-axis. Typically, the first and second axes are mutually orthogonal and both axes are approximately orthogonal to a central ray traveling toward the film. An exemplary line beam for laser crystallization may have a beam width at the film of less than about 20 microns, e.g. 3-4 microns, and a beam length of about 700 mm. With this arrangement, the film can be scanned or stepped in a direction parallel to the beam width to sequentially melt and subsequently crystallize a film having a substantial length, e.g., 900 mm or more.

In some cases, e.g. sequential lateral solidification processes, it may be desirable to ensure that the silicon film is exposed using a beam having an intensity that is relatively uniform across the short-axis and that drops off sharply at the short-axis edges (i.e. a beam having relatively steep, short-axis sidewalls). More specifically, failure to obtain a steep sidewall on the trailing short-axis edge may result in the undesirable crystal quality of new grains near the short-axis edge due to insufficient overlap between adjacent pulses. Also, in some implementations, it may be desirable to have a steep sidewall on the leading short-axis edge to reduce surface variations and provide more consistent lateral growth. One way to achieve this shape is to focus a laser at a short-axis stop, e.g. field stop, which is shaped as an elongated slit that is aligned in the direction of the long-axis. An optic may then be used to produce an image of the short-axis stop at the film. With this arrangement, a beam having relatively steep, short-axis sidewalls may be obtained. For the dimensions contemplated above, e.g. a beam width at the film of less than 20 microns, it may be important to control the dimensions of the short-axis stop to relatively close tolerances.

In some cases, it may be desirable to ensure that each portion of the silicon film is exposed to an average laser energy density that is controlled within a preselected energy density range during melting. In particular, energy density control within a preselected range is typically desired for locations along the shaped line beam, and a somewhat constant energy density is desirable as the line beam is scanned relative to the silicon film. High energy density levels may cause the film to flow resulting in undesirable "thin spots", a non-flat surface profile and poor grain quality. This uneven distribution of film material is often termed "agglomeration" and can render the crystallized film unsuitable for certain applications. On the other hand, low energy density levels may lead to incomplete melting and result in poor grain quality. By controlling energy density, a film having substantially homogeneous properties may be achieved.

One factor that can affect the energy density within an exposed film is the spatial relationship of the thin film relative to the pulsed laser's depth of focus (DOF). This DOF depends on the focusing lens, but for a typical lens system configured to produce a line beam having a 20 micron beam width, a good approximation of DOF may be about 20 microns.

With the above in mind, it is to be appreciated that a portion of the silicon film that is completely within the laser's DOF will experience a different average energy density through the film's thickness than a portion of the silicon film that is only partially within the laser's DOF. Thus, surface variations of the silicon film, the glass substrate and the vacuum chuck surface which holds the glass substrate, even variations as small as a few microns, if unaccounted for, can lead to unwanted variations in average energy density from one film location to another. Moreover, even under controlled manufacturing conditions, total surface variations (i.e., vacuum chuck+glass substrate+film) can be about 35 microns. It is to be appreciated that these surface variations can be especially problematic for focused thin beam having a DOF of only about 20 microns.

As indicated above, for some implementations, a desirable beam may have a relatively flat so-called "tophat" type intensity profile at the film with relatively sharp sidewall slopes. To achieve this shape, it may be desirable to use a relatively large NA optical system between the short axis stop (see description above) and the film to obtain a good reproduction of the slit and sharp sidewalls at the film. However, an increase in the numerical aperture of the optical system typically results in a commensurate decrease in the depth of field. Thus, it would be desirable to reduce a system's dependence on a relatively large DOF to allow the use of a higher NA optical system, which in turn, may produce a better intensity profile shape at the film.

With the above in mind, Applicants disclose systems and methods for implementing an interaction between a shaped line beam and a film deposited on a substrate.

SUMMARY OF THE INVENTION

Systems and methods are provided for shaping laser light as a line beam for interaction with a film that may have an imperfect, non-planar surface. In one aspect of an embodiment of the present invention, the system may include a beam stop that defines an edge. For the system, a sensor may be provided that measures a distance between a selected point on a surface of the film and a reference plane and generates a signal representative of the measured distance. An actuator may be coupled to the beam stop and responsive to the signal to move a portion of beam stop edge. Movement of the beam stop edge portion shifts a corresponding portion of the focused line beam in a direction normal to the reference plane, to produce a line beam that more closely conforms to the surface profile of the film.

In a particular embodiment of the system, the beam stop may include a plurality of independently moveable beam stop segments which together define the beam stop edge. For this embodiment, the system may include a plurality of sensors, with each sensor measuring a distance between a respective point on a surface of the film and the reference plane. Each sensor then generates a respective signal representative the distance measurement. In addition, the system may include a plurality of actuators, with each actuator coupled to a respective beam stop segment and responsive to a signal from a respective sensor. With this arrangement, each actuator may move a portion of the beam stop edge to thereby shift a corresponding portion of the focused line beam in a direction normal to the reference plane.

In another aspect, a system may be provided having a pair of beam stops with the edge of the first beam stop spaced from the edge of the second beam stop to form a slit between the two beam stops. One or both of the beam stops may be coupled to one or more actuators to move portion(s) of the beam stops edge in response to a signal from a distance measurement sensor. A focusing optic may also be provided to produce an image of the slit at the film.

DETAILED DESCRIPTION OF PREFERRED EMBODIMENTS

Figure 1:
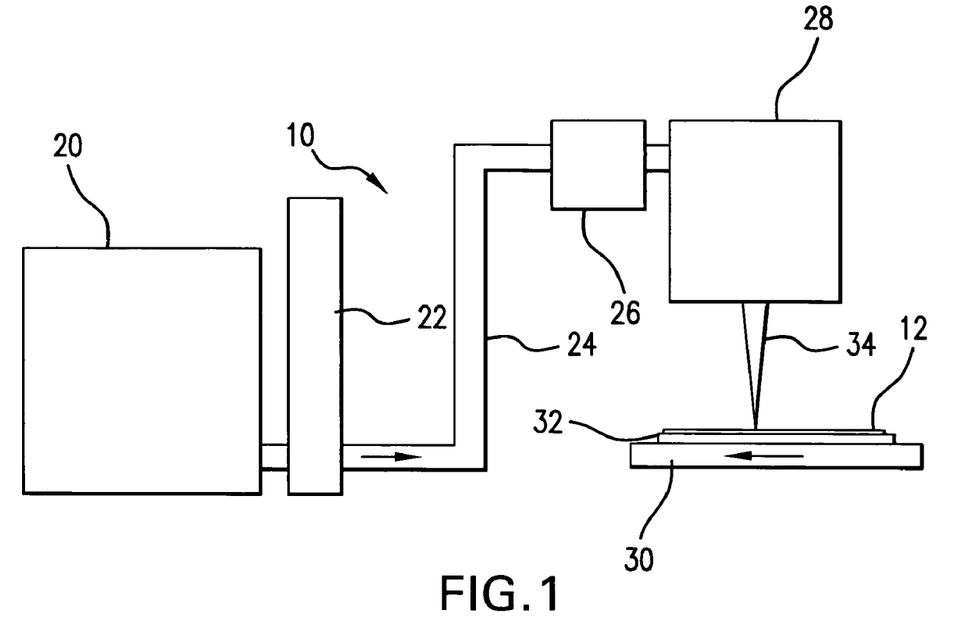
FIG. 1 shows a schematic view of the primary components of an exemplary production system for crystallizing an amorphous silicon film.

Referring initially to FIG. 1, there is shown a schematic, not to scale, view of the primary components of a production system, designated generally system 10, for crystallizing an amorphous silicon film 12. As shown, the system 10 may include a laser source 20 for generating a pulsed laser beam, a pulse stretcher 22 for increasing pulse duration and a beam delivery unit 24 which may have a mechanism to actively steer the beam and/or an active beam expander.

In overview, the laser source 20 may be a two chamber laser having a power oscillator and a power amplifier, and accordingly, is often referred to as a so-called POPA laser source. In one implementation of the crystallization process described above, a 6 Khz (6000 pulses per second) POPA laser may be used with pulse energies of approximately 150 mJ. With this arrangement, a 730 mm×920 mm film may be processed (with 60 percent overlap) in about 75 seconds. The power oscillator and the power amplifier each comprise a discharge chamber which may contain two elongated electrodes, a suitable laser gas, e.g., XeCl, XeF, a tangential fan for circulating the gas between the electrodes and one or more water-cooled finned heat exchangers (not shown).

It is to be appreciated that other types of laser sources could be used in the system 10, to include solid state lasers, excimer lasers having one chamber, excimer lasers having more than two chambers, e.g., an oscillator chamber and two amplifying chambers (with the amplifying chambers in parallel or in series), or a solid state laser that seeds one or more excimer amplifying chambers. Other designs are possible. Further details for a two chamber, gas discharge, pulsed laser source 20, can be found in U.S. application Ser. No. 10/631,349, entitled CONTROL SYSTEM FOR A TWO CHAMBER GAS DISCHARGE LASER, filed on Jul. 30, 2003, U.S. Ser. No. 10/356,168, entitled AUTOMATIC GAS CONTROL SYSTEM FOR A GAS DISCHARGE LASER, filed on Jan. 31, 2003, U.S. Ser. No. 10/740,659, entitled METHOD AND APPARATUS FOR CONTROLLING THE OUTPUT OF A GAS DISCHARGE MOPA LASER SYSTEM, filed on Dec. 18, 2003, U.S. Ser. No. 10/676,907, entitled GAS DISCHARGE MOPA LASER SPECTRAL ANALYSIS MODULE filed on Sep. 30, 2003, U.S. Ser. No. 10/676,224, entitled OPTICAL MOUNTINGS FOR GAS DISCHARGE MOPA LASER SPECTRAL ANALYSIS MODULE, filed Sep. 30, 2003, U.S. Ser. No. 10/676,175, entitled GAS DISCHARGE MOPA LASER SPECTRAL ANALYSIS MODULE, filed Sep. 30, 2003, U.S. Ser. No. 10/631,349, entitled CONTROL SYSTEM FOR A TWO CHAMBER GAS DISCHARGE LASER, filed Jul. 30, 2003, U.S. Ser. No. 10/627,215, entitled VERY NARROW BAND, TWO CHAMBER, HIGH REP-RATE GAS DISCHARGE LASER, filed on Jul. 24, 2003, U.S. Ser. No. 10/607,407, entitled METHOD AND APPARATUS FOR COOLING MAGNETIC CIRCUIT ELEMENTS, filed on Jun. 25, 2003, U.S. Ser. No. 10/922,692, entitled TIMING CONTROL FOR TWO-CHAMBER GAS DISCHARGE LASER SYSTEM, filed on Aug. 20, 2004, U.S. Pat. No. 6,625,191, entitled HIGH REP RATE MOPA LASER SYSTEM, and U.S. Pat. No. 6,567,450, entitled BASIC MODULAR MOPA LASER SYSTEM, the disclosures of all of which are hereby incorporated by reference herein.

Continuing with FIG. 1, the system 10 may further include a stabilization metrology module 26 for measuring one or more beam characteristics, e.g., wavefront and/or beam pointing, and generating control signals for use by the active steering unit and/or the active beam expander. System 10 may also include an optics module 28 for beam homogenization, beam shaping and/or beam focusing, and a moveable stage system 30 for holding and positioning a silicon film 12 that has been deposited on a substrate 32, which can be, for example, glass. A layer of buffer material (not shown) may be interposed between the glass and the silicon layer.

In overview, the system 10 shown in FIG. 1 and described in greater detail below can be configured to generate a focused thin beam 34, e.g. line beam, having a width of the film 12 of about 20 microns or less (short-axis), e.g. 3-4 microns, and a length of 700 mm or more (long-axis) and a depth of focus (DOF) of about +/−30 to 50 microns. Each pulse of the focused thin beam can be used to melt a strip of amorphous silicon, and after the end of the pulse, the molten strip crystallizes. In particular, the molten strip crystallizes in a lateral growth process in which grains grow in a direction parallel to the short-axis. Grains grow inward (parallel to the short-axis) from both edges and meet creating a ridge (a so-called grain boundary protrusion) along the center of the strip which extends out of the plane of the silicon film. The stage is then moved, either incrementally or continuously, to expose a second strip that is parallel to and overlaps a portion of the first strip. During exposure, the second strip melts and subsequently crystallizes. An overlap sufficient to re-melt the ridge may be used. By re-melting the ridge, a relatively flat film surface (e.g., peak-to-peak value of ~15 nm) may be maintained. This process, which is hereinafter referred to as thin beam directional crystallization (TDX) is typically repeated until the entire film is crystallized.

Figure 2:
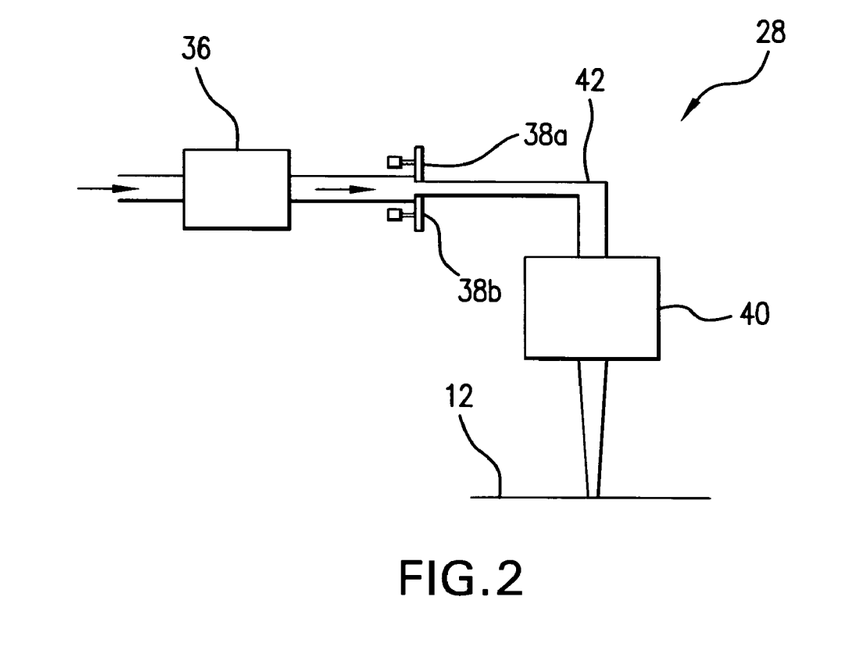
FIG. 2 shows a schematic view of an optics module for beam homogenization, beam shaping and/or beam focusing.

FIG. 2 shows an example of an optics module 28 which may include a homogenizing unit 36, short-axis shaping unit having opposed beam stops 38*a,b* and short-axis focusing/long-axis expanding optics unit 40, all of which are arranged along a common beam path 42. When used, the homogenizing unit 36 may include one or more optics, e.g. lens arrays, distributed delay devices, etc., for homogenizing the beam in the short-axis and one or more optics, e.g. lens arrays, distributed delay devices, etc., for homogenizing the beam in the long-axis.

Figure 3:
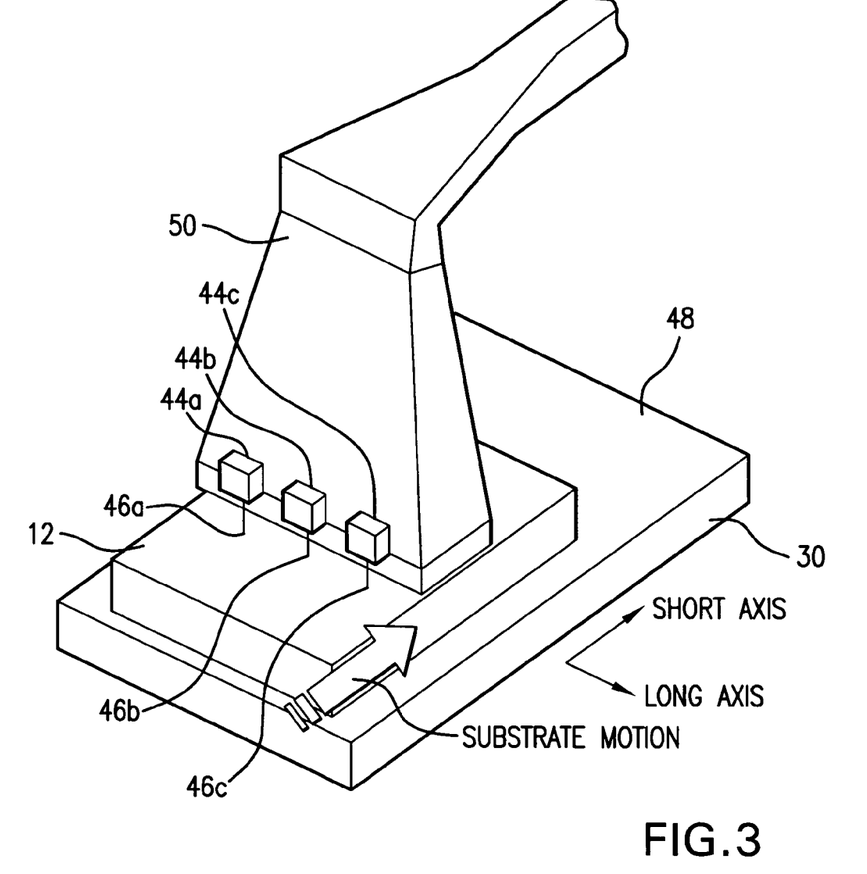
FIG. 3 is a perspective view of a portion of the system shown in FIG. 1.

As shown in FIG. 3, the system may also include one or more sensors, which for the embodiment shown is three sensors 44*a-c*, with each sensor 44*a-c* measuring a distance between a respective point 46*a-c* on a surface of the film 12 and a reference plane 48, which can be, for example, a surface of the stage system 30 or another plane parallel thereto, e.g. a plane containing the sensors 44*a-c*). The sensors 44*a-c* may be, for example, autofocus sensors (active or passive) or other such equipment known in the pertinent art. For the system 10, each sensor may generate a respective signal representative the distance measurement.

FIG. 3 shows that a housing 50 may be provided to partially enclose the laser beam as the beam travels on a path toward the film 12. Also shown, the sensors 46*a-c* may be situated along a line that is parallel to the long axis and positioned to measure points 46*a-c* on the film before the points 46*a-c* reach the laser beam. It is to be appreciated that the sensors 46*a-c* may perform measurements during the scanning of the film 12 relative to the line beam. Although three sensors 44*a-c* are shown, it is to be appreciated that more than three and as few as one sensor 44 may be used. For example, a single, moveable sensor (not shown) may be translated, back and forth, in a direction parallel to the long axis, making measurements at selected points (or effectively all points) along the long axis.

Figure 4:
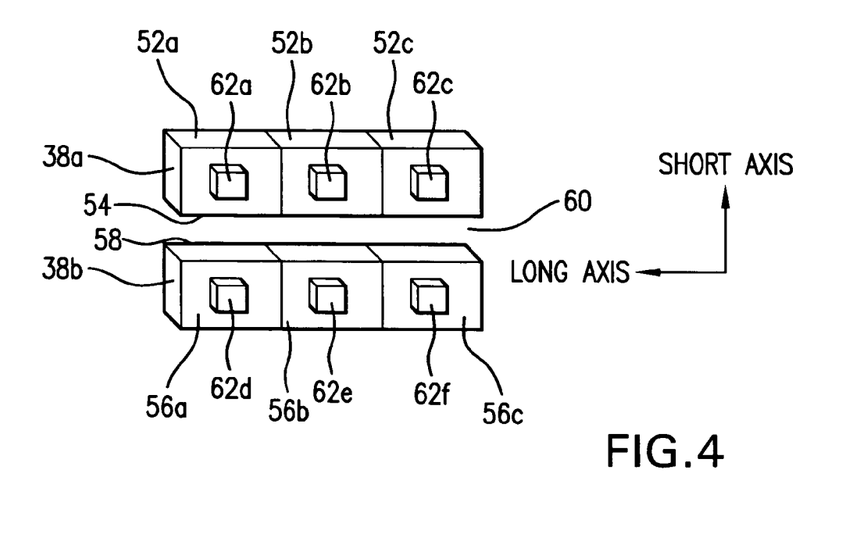
FIG. 4 shows a perspective, albeit schematic, view of a pair of segmented, short-axis beam stops.

FIG. 4 shows a pair of segmented beam stops 38*a,b*. As shown, beam stop 38*a* is divided along the long axis into three independently moveable beam stop segments 52*a-c* which together define the beam stop edge 54. Similarly, beam stop 38*b* is divided along the long axis into three independently moveable beam stop segments 56*a-c* which together define the beam stop edge 58. For the embodiment shown, the edge 54 of the beam stop 38*a* may be spaced from the edge 58 of the beam stop 38*b* in the short-axis to form a slit 60 between the two beam stops 38*a,b*. Although three segments for each beam stop are shown, it is to be appreciated that more than three and as few as two segments may be used.

FIG. 4 further shows that the system may include a plurality of actuators 62*a-f*, with each actuator 62*a-f* coupled to a respective beam stop segment 52*a-c*, 56*a-c* and responsive to a signal from a corresponding sensor 44*a-c* (as labeled in FIG. 3). For example, actuator 62*a* and actuator 62*d* may be responsive to a signal from a sensor 44*c*, actuator 62*b* and actuator 62*e* may be responsive to a signal from a sensor 44*b*, and actuator 62*c* and actuator 62*f* may be responsive to a signal from a sensor 44*a*.

Figure 5:
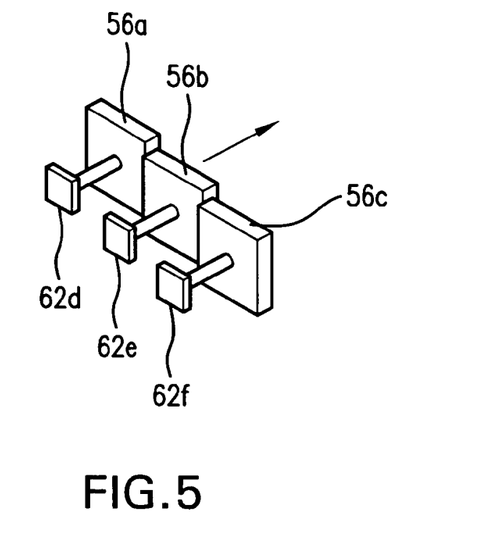
FIG. 5 shows a perspective, albeit schematic, view of a segmented, short-axis beam stop, shown after actuated movement of two of the segments.
Figure 6:
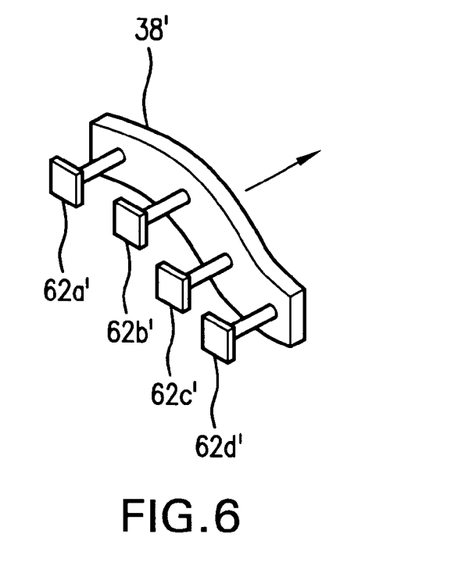
FIG. 6 shows a perspective, albeit schematic, view of a non-segmented, short-axis beam stop.

With this arrangement, as illustrated in FIG. 5, each actuator 62*d-f* may move a corresponding segment 56*a-c* of the beam stop edge 58 in response to signals from sensors 44*a-c* (see FIG. 2). Movement of the segments 56*a-c* may be continuous or periodically. FIG. 6 illustrates an alternate embodiment of a beam stop 38' that is non-segmented, e.g. one piece or monolithic, and is made of a somewhat flexible material and/or construction. As shown, portions of the beam stop 38' may be selectively moved via actuators 62*a'*-62*d'*.

For the system 10, as illustrated by FIG. 2, portion(s) of the beam traveling along the beam path 42 may strike the stops 38*a,b* and a portion of the beam may pass through the slit 60 (see FIG. 4) without contacting either stop 38*a,b*. Thus, the stops 38*a,b* effectively aperture-limit the beam incident on the film 12. The excess energy in the tails of the beam may be dumped on the stops 38*ab*, and not on the film 12. Also, advantageously, any small beam pointing deviation present in the beam upstream of the stops 38*a,b* may be reduced at the stops 38*a,b*. Functionally, the short-axis beam stops 38*a,b* may be absorptive stops, reflective stops, or refractive stops. As used herein, the term absorptive stop means a stop which absorbs more incident light than the sum of the incident light the stop reflects and refracts; the term reflective stop means a stop which reflects more incident light than the sum of the incident light the stop absorbs and refracts; and the term refractive stop means a stop which refracts more incident light than the sum of the incident light the stop absorbs and reflects. In some arrangements, a single short-axis stop 38, that is actuator controlled to adjust the shape of the beam stop edge, may be used in place of the pair of stops shown in FIGS. 2 and 4 to produce a beam profile having a steep trailing edge slope (i.e., the edge corresponding to the material that will not be re-melted during the TDX process) while leaving the leading edge unaffected.

FIG. 2 also shows that the optics module 28 may include a short-axis focusing/long-axis expanding optics unit 40 which receives light along the beam path 42 from the beam stops 38*a,b*. Typically, the beam is initially focused on a plane at or near the beam stops 38*a,b* and this focal plane may then be imaged in the short-axis (by the short-axis focusing/long-axis expanding optics unit 40) to produce a desired intensity profile at the film 12. In one implementation, a desired intensity profile at the film 12 may include beam width (FWHM) of about 3-4 μm, an intensity uniformity better than about 5% along the flat top of the profile, and steep edge slopes that may be less than about 3 um between the 10% and 90% of full intensity.

Figure 7:
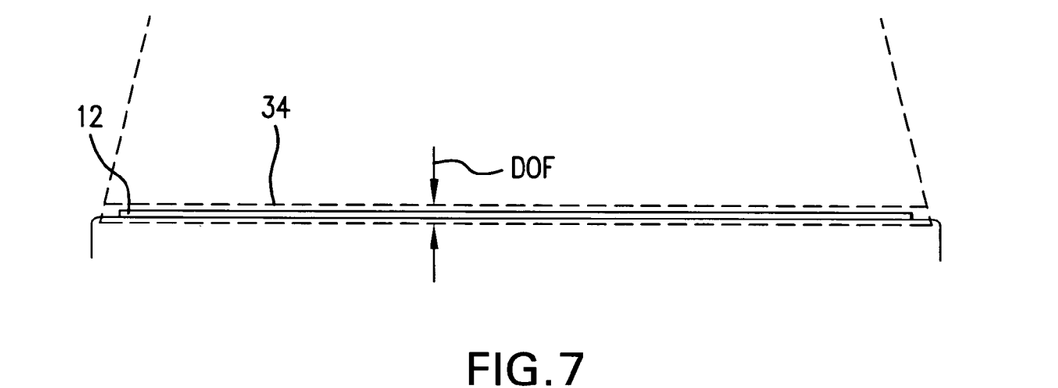
FIG. 7 shows a line beam having a depth of focus (DOF) that is relatively straight in the long axis.
Figure 8:
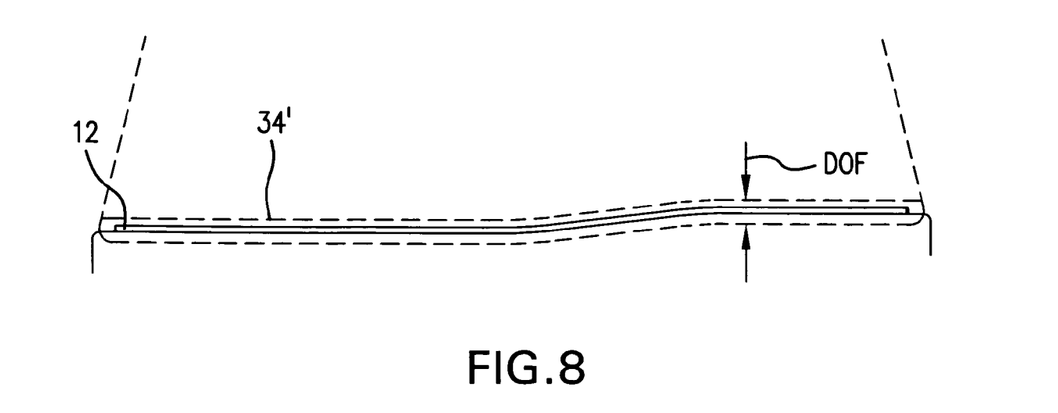
FIG. 8 illustrates a line beam having a depth of focus (DOF) that includes a shifted (i.e. non-straight) portion, in the long axis.

FIGS. 7 and 8 illustrate that a movement of one or more portions/segments of the stop(s) 38 results in a shift of a corresponding portion of the focused line beam in a direction normal to the reference plane. More specifically, a displacement of one or more portions/segments of the stop(s) 38 along the beam path 42 leads to a shift of the image at the film 12. For example, in one optical setup, a displacement of about 1 mm leads to a shift of the image at the film 12 of about 16 to 20 um. FIG. 7 illustrates a line beam 34 having a depth of focus (DOF) that is relatively straight in the long axis. This line beam corresponds to a configuration of the beam stops 38a,b (FIG. 4) in which all segments 52a-c, 56a-c are aligned and the beam stops 38a,b have straight edges 54, 56. On the other hand, FIG. 8 illustrates a line beam 34' having a depth of focus (DOF) that includes a shifted (i.e. non-straight) portion, along the long axis, and conforms with a film 12 in which a strip in the long axis has an irregular profile. The line beam 34' corresponds to a configuration of the beam stops 38a,b (FIG. 4) in which one or more of the segments 52a-c, 56a-c have been moved relative to the other segments (see FIGS. 5 and 6).

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. While the particular aspects of embodiment(s) of the Systems and Methods for Implementing an Interaction between a Laser Shaped as a Line Beam and a Film Deposited on a Substrate described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present Systems and Methods for Implementing an Interaction between a Laser Shaped as a Line Beam and a Film Deposited on a Substrate is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

I claim:

1. A system for shaping laser light as a line beam for interaction with a film having a non-planar surface, said system comprising:
   a beam stop defining an edge;
   a sensor measuring a distance between a selected point on a surface of said film and a reference plane and generating a signal representative thereof; and
   an actuator coupled to said beam stop and responsive to said signal for moving a portion of said edge relative to another portion of said edge to shift a portion of said focused line beam relative to another portion of said focused line beam in a direction normal to said reference plane.

2. A system as recited in claim 1 wherein said beam stop comprises a plurality of independently moveable beam stop segments which together define said edge.

3. A system as recited in claim 2 comprising a plurality of sensors, each said sensor measuring a distance between a respective point on a surface of said film and the reference plane and generating a respective signal representative thereof.

4. A system as recited in claim 3 comprising a plurality of actuators, each said actuator coupled to a respective said beam stop segment and responsive to a signal from a respective sensor for moving a portion of said edge to shift a corresponding portion of said focused line beam in a direction normal to said reference plane.

5. A system as recited in claim 1 wherein said sensor is an autofocus sensor.

6. A system as recited in claim 1 wherein said beam stop comprises a monolithic beam stop which defines said edge.

7. A system as recited in claim 6 comprising a plurality of sensors, each said sensor measuring a distance between a respective point on a surface of said film and the reference plane and generating a respective signal representative thereof.

8. A system as recited in claim 7 wherein said edge defines a curvature and wherein said system comprising a plurality of actuators, each said actuator coupled to a beam stop portion and responsive to a signal from a respective sensor for changing the curvature of said edge to shift a corresponding portion of said focused line beam in a direction normal to said reference plane.

9. A system as recited in claim 1 wherein said beam stop is a first beam stop and said system further comprises a second beam stop defining an edge, said second beam stop edge spaced from said first beam stop edge to establish a slit therebetween and an actuator coupled to said second beam stop and responsive to said signal for moving at least a portion of said second beam stop edge to shift at least a portion of said focused line beam in a direction normal to said reference plane.

10. An apparatus as recited in claim 1 wherein said beam stop is a reflective stop.

11. An apparatus as recited in claim 1 wherein said beam stop is an absorptive stop.

12. An apparatus as recited in claim 1 wherein said beam stop is a refractive stop.

13. A system for shaping laser light as a line beam for interaction with a film having a non-planar surface, said system comprising:
    a beam stop;

a plurality of sensors measuring respective positions of respective selected points on a surface of said film and generating respective signals representative thereof; and a plurality of actuators, each actuator coupled to said beam stop and responsive to a signal from a corresponding sensor to deflect a portion of said beam stop relative to another portion of said beam stop to shift a corresponding portion of said focused line beam relative to another portion of said focused line beam and relative to said film.

14. A system as recited in claim 13 wherein said beam stop comprises a plurality of independently moveable beam stop segments.

15. A system as recited in claim 13 wherein said sensors are autofocus sensors.

16. A system as recited in claim 13 wherein said system further comprises an optic for focusing light from said beam stop at said film.

17. A method for shaping laser light as a focused line beam for interaction with a film having a non-planar surface, said method comprising the acts of:

providing a beam stop defining an edge;

measuring a distance between a selected point on a surface of said film and a reference plane and generating a signal representative thereof; and moving a portion of said edge relative to another portion of said edge in response to said signal to shift a portion of said focused line beam relative to another portion of said focused line beam in a direction normal to said reference plane.

18. A method as recited in claim 17 wherein said beam stop comprises a plurality of independently moveable beam stop segments.

19. A method as recited in claim 17 wherein said sensors are autofocus sensors.

20. A method as recited in claim 17 wherein said beam stop comprises a monolithic beam stop.

* * * * *